United States Patent
Bushek

[11] Patent Number: 6,095,563
[45] Date of Patent: Aug. 1, 2000

[54] POCKETED FOUR-LINK FRONT SUSPENSION

[75] Inventor: Mark Bushek, Dundee, Mich.

[73] Assignee: Chrysler Corporation, Auburn Hills, Mich.

[21] Appl. No.: 09/158,739

[22] Filed: Sep. 22, 1998

[51] Int. Cl.[7] .............................. B62D 7/99; B62D 21/00; B62D 21/11
[52] U.S. Cl. ................................. 280/788; 280/124.128; 280/124.153
[58] Field of Search ........................... 280/788, 124.128, 280/124.153

[56] References Cited

U.S. PATENT DOCUMENTS

| | | | |
|---|---|---|---|
| 3,177,005 | 4/1965 | Duero et al. | 280/788 |
| 3,486,763 | 12/1969 | Hexel | 280/788 |
| 4,033,605 | 7/1977 | Smith et al. | 280/664 |
| 4,813,704 | 3/1989 | Smith | 280/692 |
| 4,989,894 | 2/1991 | Winsor et al. | 280/690 |
| 5,335,934 | 8/1994 | Hiller | 280/788 |
| 5,601,304 | 2/1997 | Tilly et al. | 280/673 |

Primary Examiner—Kenneth R. Rice
Attorney, Agent, or Firm—William J. Coughlin

[57] ABSTRACT

A suspension system for a motor vehicle wherein an upper control arm on each side of the vehicle is located in an aperture within the vehicle frame and operably connected to a front axle. Each upper control arm is pivotably connected to the frame and is capable of rotating into the aperture in response to a force generated by contact of its respective wheel with an irregularity in the road surface during the operation of the motor vehicle. As the upper control arms are placed within the frame rails, interference between the control arms and other components located in the engine compartment is substantially eliminated. The substantial elimination of this interference reduces the design effort and lead time associated with the development of the vehicle frame and suspension system as well as integrating the engine into the vehicle. The ability to assemble and service the vehicle are likewise improved through the elimination of the entanglement between suspension components and engine components. Additionally, placement of the upper control arms within the frame rails serves to isolate the control arms from the elevated temperatures of the engine compartment.

20 Claims, 2 Drawing Sheets

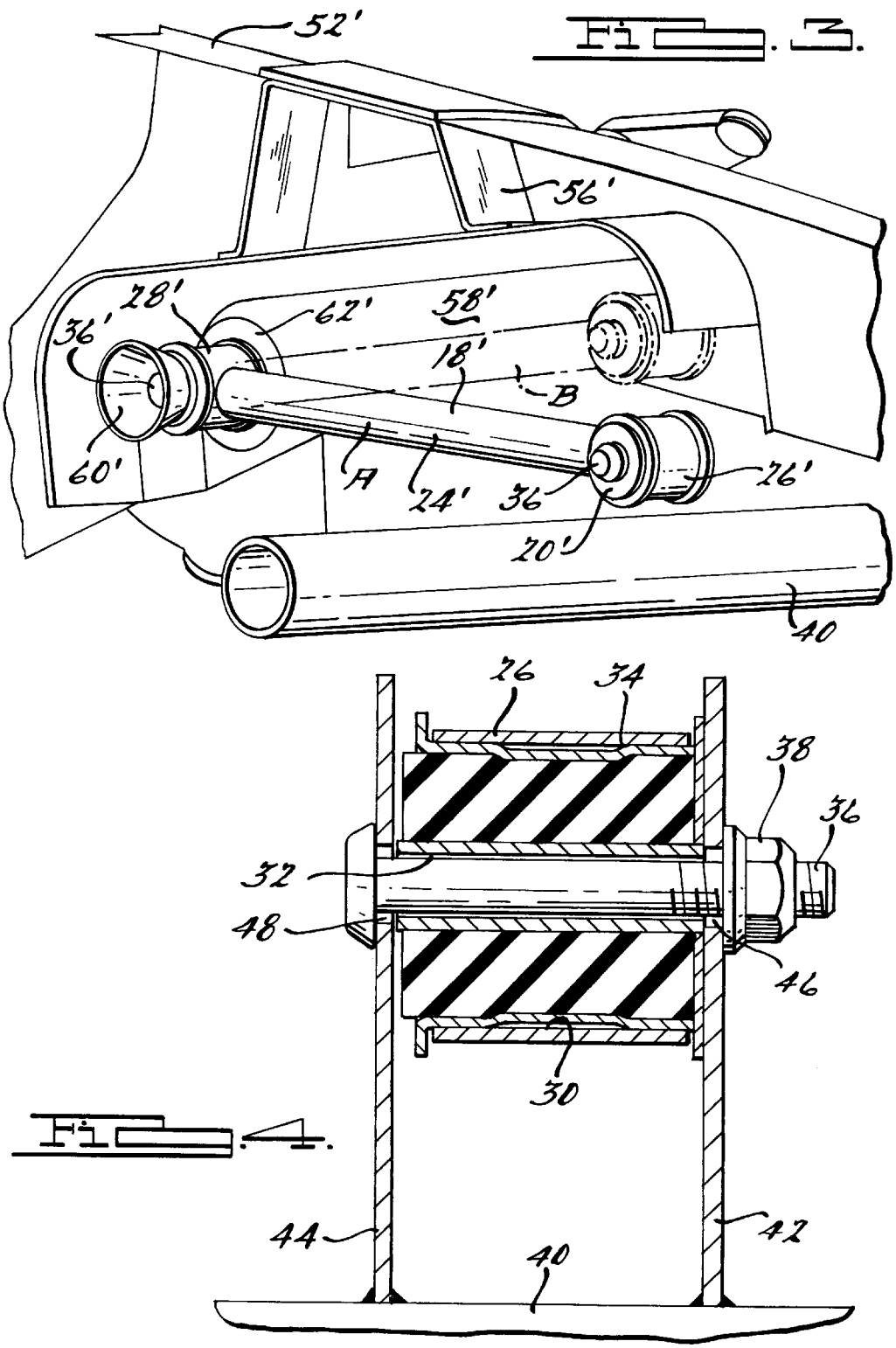

POCKETED FOUR-LINK FRONT SUSPENSION

BACKGROUND OF THE INVENTION

1. Technical Field

The present invention generally relates to suspension systems for motor vehicles and more particularly, to a suspension mounting arrangement for supporting the front axle of a motor vehicle wherein a front suspension element on each side of the vehicle is located in an aperture within the vehicle frame and pivotably connected to the frame such that in operation, the suspension element is capable of rotating into the aperture.

2. Discussion

Conventional motor vehicles are provided with independent suspension systems for absorbing impulsive forces generated by the contact of the wheels with irregular road surfaces and other vibrations while providing a smooth and comfortable ride for the vehicle occupants. In suspension systems of this type, it is common to support an axle with a set of control arms, wherein the control arms operably connect the axle to the vehicle frame. The mounting hardware for the control arms typically includes a pivot bolt which secures the control arm to the vehicle frame. Elastomeric components, such as bushings, are also commonly included in the mounting hardware for the control arm to further reduce the level of vibrations and noise transmitted to the vehicle occupants.

While these prior art suspension systems have proven to be commercially acceptable, they do possess several significant drawbacks. One such drawback relates to packaging of the prior art control arms into a vehicle. As the prior art front control arms typically extend into the engine compartment and as the engine compartment of most modern vehicles tends to be small, integration of the control arms into the vehicle is often an iterative process, tending to consume large amounts of engineering resources. Frequently, those developing a suspension system are forced to work with numerous components in the engine compartment simultaneously so as to resolve problems relating to interference between components, structural capacity, heat, and noise and vibration.

Another drawback, also relating to the placement of the upper control arm within the engine compartment, concerns the long-term exposure of the control arm to elevated temperatures, particularly when elastomeric materials are included in the control arm mounting hardware. Elastomeric materials can degrade rapidly when exposed to elevated temperatures, reducing the life of these components and causing the performance of the suspension system to be impaired. Impaired performance of the suspension system causes increased levels of noise and vibration to be transmitted to the occupants of the vehicle and in severe cases, can cause serious steering or traction related problems affecting the safety of the vehicle occupants.

Consequently, there remains a need in the art for a suspension system that positions the upper control arms in a manner so as to eliminate interference with other vehicle components located within the engine compartment and to shield the control arms from the elevated temperatures of the engine.

SUMMARY OF THE INVENTION

It is therefore an object of the present invention to provide a suspension system having upper control arms which are positioned in a manner so as to eliminate interference with other vehicle components located within the engine compartment.

It is yet another object of the present invention to provide a suspension system that shields the control arm from the elevated temperatures of the engine.

Briefly, the present invention comprises a suspension system for a motor vehicle wherein an upper control arm on each side of the vehicle is located in an aperture within the vehicle frame and operably connected to a front axle. Each upper control arm is pivotably connected to the frame and is capable of rotating into the aperture in response to an impulsive force generated by contact of its respective wheel with an irregularity in the road surface during the operation of the motor vehicle.

As the upper control arms are placed within the frame rails, interference between the control arms and other components located in the engine compartment is substantially eliminated. The substantial elimination of this interference reduces the design effort and lead time associated with the development of the vehicle frame and suspension system as well as integrating the engine into the vehicle. The ability to assemble and service the vehicle are likewise improved through the elimination of the entanglement between suspension components and engine components. Additionally, placement of the upper control arms within the frame rails serves to isolate the control arm from the elevated temperatures of the engine compartment.

Other advantages and features of the present invention will become apparent from the subsequent description and the appended claims, taken in conjunction with the accompanying drawings.

BRIEF DESCRIPTION OF THE DRAWINGS

FIG. 3 is a partial section view showing the connection of the right upper control arm assembly to the right side rail of the vehicle frame.

FIG. 4 is a sectional view showing the connection of the upper control arm assembly to the front axle.

DETAILED DESCRIPTION OF THE PREFERRED EMBODIMENT

Figure 1:
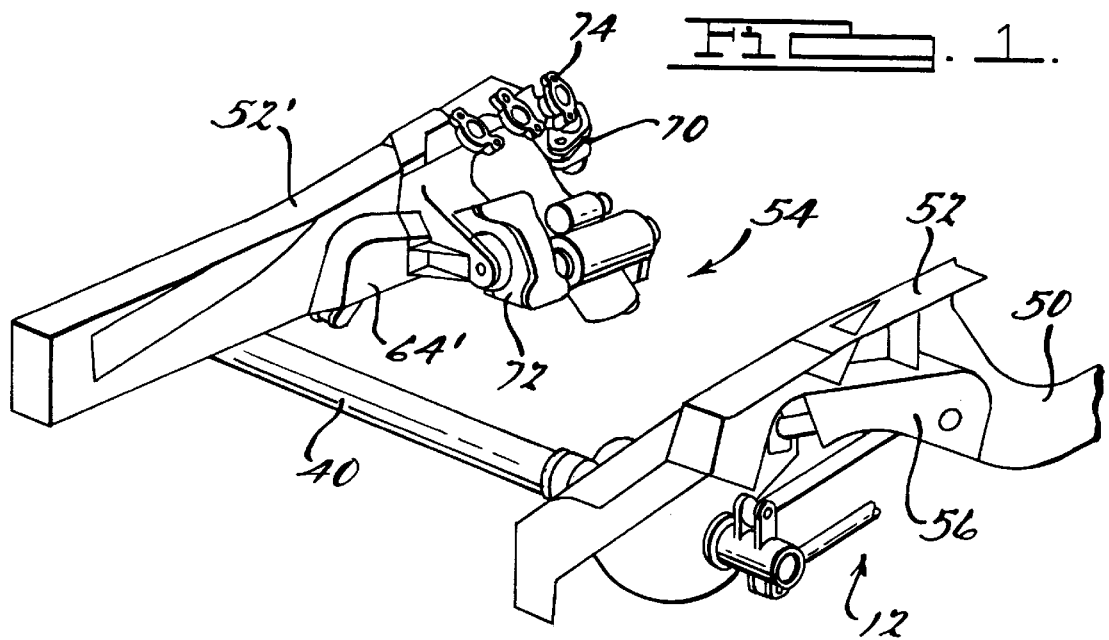
FIG. 1 is a partial view of the front end of a vehicle having the vehicle frame and suspension system of the present invention.

Certain terminology is used in the following detailed description for convenience only and is not intended to be limiting. For example, the words "left", "right", "upper", "lower" and "front" are intended to designate direction or orientation shown in the drawings to which reference is being made. Additionally, as both the vehicle frame and the suspension system on the left and right sides of the vehicle are mirror images of each other, only one side of the frame and suspension system will be described in detail. Similar or corresponding elements of the right hand side of the vehicle are identified by the same reference numerals as used to describe those on the left-hand side of the vehicle.

With initial reference to FIG. 1 of the drawings, the front end of a motor vehicle is partially shown and includes a suspension system 10, a front axle 40, a vehicle frame 50 and a conventional engine 70. Vehicle frame 50 is a preassembled combination of stamped sheet steel and includes left and right side rails 52 which extend generally longitudinally of the vehicle. The left and right side rails 52 form an engine compartment 54 into which engine 70 is operably positioned so as to power the vehicle. Engine mounts 72 secure engine 70 to the left and right side rails 52. Side rails 52 include various reinforcing elements, such as rail pocket reinforcements 56, to increase the strength and rigidity of the vehicle frame 50. Typically, these reinforcing elements are welded to the side rails 52 during the fabrication of the vehicle frame 50.

Figure 2:
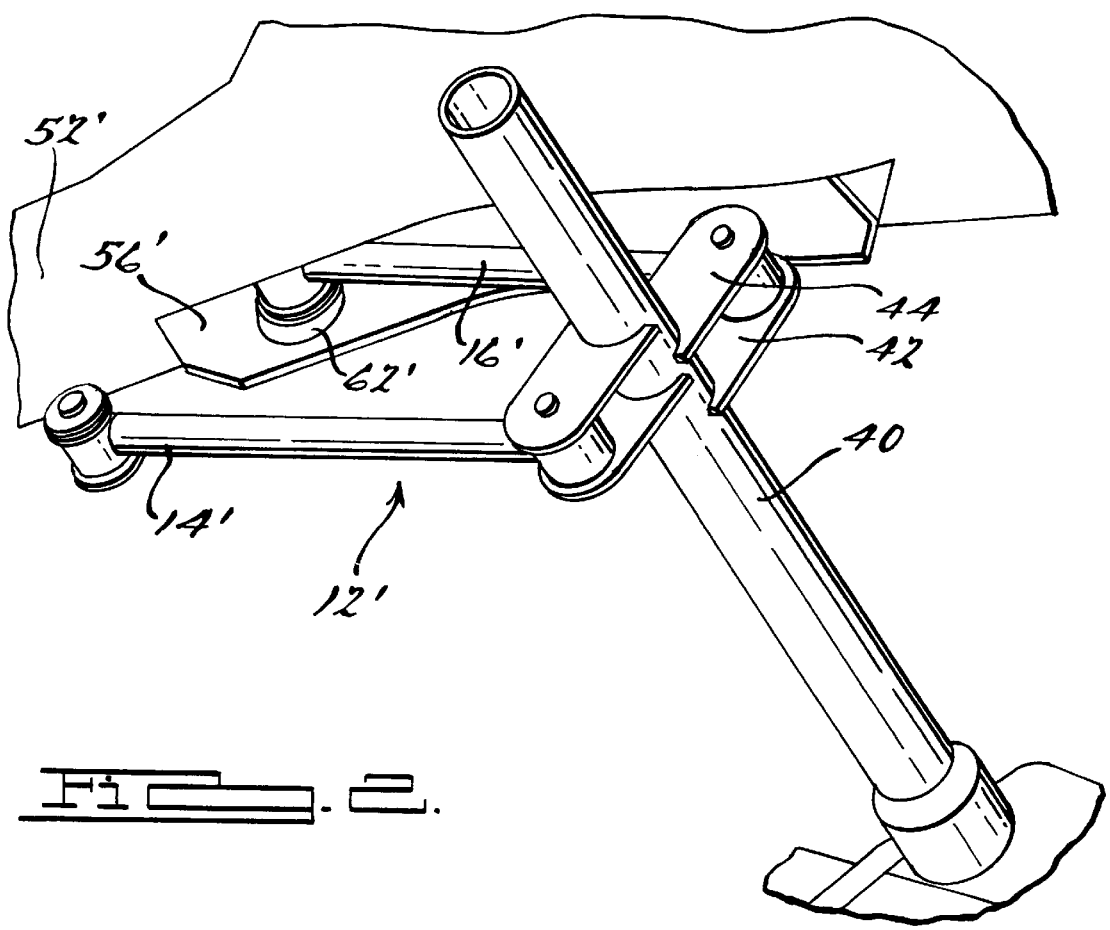
FIG. 2 is a partial perspective view from the underside of the vehicle showing the connection of the upper and lower control arm assemblies to the front axle.

Suspension system 10 includes left and right suspension sets 12. Referring now to FIGS. 2 and 3, each of the suspension sets 12 is shown to include a conventional lower control arm assembly 14 and an upper control arm assembly 16. The upper control arm assembly 16 includes an upper control arm 18 and a pair of resilient bushings 20. One of the bushings 20 is provided at the interconnection between upper control arm 18 and front axle 40. A substantially identical bushing (not specifically shown) is provided at the interconnection between the upper control arm 18 and the vehicle frame 50. Upper control arm 18 is shown in FIG. 3 to include a generally cylindrical or tubular arm 24 to which is fixed a forward portion 26 and a rear portion 28. Forward and rear portions 26 and 28 are cylindrically shaped and positioned such that their axes are perpendicular to that of arm 24. As shown, upper control arm 18 can be a one-piece casting or a multi-piece welded fabrication. Alternately, the upper control arm 18 can be a conventionally manufactured, stamped metal fabrication.

Forward and rear portions 26 and 28 are shown to include an axially bored hole 30 for receiving the generally cylindrical resilient bushings 20 which are formed of rubber or another suitable elastomeric material. Bushings 20 contain a through-hole 32 located approximately concentrically to the outer diameter 34.

Front axle 40 is operably connected to vehicle frame 50 through the left side and right side suspension elements 12. As shown in FIG. 4, upper control arm assembly 16 is disposed between first and second support brackets 42 and 44 which are fixed to front axle 40. Upper control arm assembly 16 is pivotably retained within the support brackets by pivot bolt 36. Pivot bolt 36 extends through apertures 46 and 48 in support brackets 42 and 44, respectively and is retained by a nut 38. As pivot bolt 36 extends through hole 32, resilient bushing 20 operably reduces the level of noise and vibration transmitted through upper control arm assembly 16 to vehicle frame 50. Left and right front wheels (not shown) are supported by front axle 40.

Referring back to FIGS. 2 and 3, upper control arm assembly 16 is preferably pivotally connected to vehicle frame 50 at a location within its respective frame rail aperture 58. Each upper control arm assembly 16 is connected to its respective side rail through a pivot bolt 36 or other suitable fastener which extends through the frame rail 52 and the corresponding reinforcements 60 and 62 on either side of the upper control arm assembly 16 as well as first resilient bushing 20. Reinforcements 60 and 62 are part of the frame fabrication and serve to properly position the upper control arm assembly 16 and to prevent the collapse of the side rail 52 due to the exertion of clampforce associated with the fastening of the pivot bolt 36.

In the operation of a vehicle equipped with the frame and suspension system of the present invention, vertically-directed impulsive forces resulting from the rolling of the vehicle wheels over various irregularities in the surface of a road are transmitted through front axle 40 into suspension system 10. Transmission of the impulsive force into suspension system 10 causes the lower and upper control arm assemblies 14 and 16 to pivot about their connection to the vehicle frame 50 in the direction of the impulsive force so as to provide front axle 40 with a sufficient amount of freedom to eliminate or substantially reduce the transmission of the impulsive force to the vehicle occupants as well as prevent the impulsive force from damaging the front axle 40 or vehicle frame 50. Since resilient bushings 20 are used in the upper control arm assembly 16 in the connections to the vehicle frame 50 and the front axle 40, noise and vibrations associated with the responsive movement of the upper control arm assembly 16 to the vertically directed force are substantially reduced or eliminated. Alternatively, the side rails 52 and the upper control arm assemblies 16 could be configured so as to allow the front portion 26 to pivot through the side rails 52.

With particular reference to FIG. 3, the upper control arm assembly 16 is shown with upper control arm 18 in its 'design' position in solid lines and in its 'jounce' position in broken lines. The design position of upper control arm 18 represents its relative placement when the vehicle is stationary and on level ground. The jounce position of upper control arm 18 represents its relative placement when the corresponding wheel is subjected to a severe upwardly-directed impulsive force. As is shown, pivotal movement of the upper control arm 18 is maintained within side rail 52 and as such, eliminates any potential for interference with the exterior surfaces of the vehicle frame 64, the engine 70 or engine mounts 72. The elimination of the potential for various interferences renders the tasks of developing the frame and suspension system and integrating the engine into the vehicle frame less iterative, allowing both tasks can be performed more independently so as to conserve both human and time resources.

Aside from the impact on design engineering, the vehicle frame and suspension system of the present invention have several other significant advantages over the prior art. Positioning the suspension system within the side rails 52 eliminates the entanglement between suspension components and engine components, thereby improving the ability to both install and service the suspension system and engine. This improvement is primarily manifested through shortened cycle times for assembly and service but can also be demonstrated from the need for comparatively fewer specialty tools that are typically needed due to interferences and space constraints associated with conventional vehicle frames and suspension systems.

Additionally, the elimination of the entanglement between suspension components and engine components provides improved flexibility in the processing of the vehicle. For example, the vehicle frame and suspension system of the present invention permit the loading of the engine 70 into the vehicle from either the front or overhead whereas vehicles having conventional frames and suspension systems are limited to overhead loading.

The vehicle frame and suspension system of the present invention have several functional advantages as well. As the upper control arm assembly 16 is in close proximity to the engine exhaust manifold 74 as shown in FIG. 1, the containment of the upper control arm assembly 16 within its respective frame rail shelters the upper control arm assembly 16, and particularly the resilient bushings 20, from the heat contained within the engine compartment 54, thereby extending the useful life of the resilient bushings 20.

The foregoing discussion discloses and describes a preferred embodiment of the present invention. One skilled in the art will readily recognize from such discussion, and from the accompanying drawings and claims, that various changes, modifications and variations can be made therein without departing from the true spirit and fair scope of the invention as defined in the following claims.

I claim:

1. A suspension system for attachment with an axle, the suspension system comprising:

a frame structure having a longitudinal side rail with a longitudinal aperture formed therein; and a control arm assembly having first and second end portions, the first end portion adapted to be pivotably coupled to the axle, the second end portion pivotably coupled to the longitudinal side rail, the control arm assembly being pivotable about the second end portion between a first position wherein the first end portion extends at least partially from the longitudinal aperture and a second position wherein the first end portion is completely disposed within the longitudinal aperture.

2. The suspension system of claim 1, wherein the second end portion of the control arm assembly is disposed within the longitudinal aperture.

3. The suspension system of claim 2, wherein the side rail includes a pair of reinforcements, each one of the pair of reinforcements disposed within the longitudinal aperture and fixedly coupled to one of a pair of lateral side members of the side rail, the second end portion of the control arm assembly positioned between the pair of reinforcements.

4. The suspension system of claim 3, wherein each one of the pair of reinforcements has a frusto-conical shape.

5. The suspension system of claim 1, wherein each of the first and second end portions includes a bore that is perpendicular to a longitudinal axis of the control arm assembly.

6. The suspension system of claim 5, wherein the control arm assembly further includes a plurality of resilient bushings, the resilient bushings disposed in each of the bores in the first and second end portions.

7. The suspension system of claim 1, wherein the control arm assembly includes a control arm having a tubular arm member and a pair of tubular end members, the arm member having a longitudinal axis, the end member coupled to each end of the arm member, the end members oriented to the arm member such that the longitudinal axis of the end members is perpendicular to the longitudinal axis of the arm member.

8. A vehicle comprising:

an axle assembly having an axle and a wheel;

a frame structure having a longitudinal side rail with a longitudinal aperture formed therein; and a control arm assembly having first and second end portions, the first end portion pivotably coupled to the axle, the second end portion pivotably coupled to the longitudinal side rail, the control arm assembly being pivotable about the second end portion between a first position wherein the first end portion extends at least partially from the longitudinal aperture and a second position wherein the first end portion is completely disposed within the longitudinal aperture.

9. The vehicle of claim 8, wherein the second end portion of the control arm assembly is disposed within the longitudinal aperture.

10. The vehicle of claim 9, wherein the side rail includes a pair of reinforcements, each one of the pair of reinforcements disposed within the longitudinal aperture and fixedly coupled to one of a pair of lateral side members of the side rail, the second end portion of the control arm assembly positioned between the pair of reinforcements.

11. The vehicle of claim 10, wherein each one of the pair of reinforcements has a frusto-conical shape.

12. The vehicle of claim 8, wherein each of the first and second end portions includes a bore that is perpendicular to a longitudinal axis of the control arm assembly.

13. The vehicle of claim 12, wherein the control arm assembly further includes a plurality of resilient bushings, the resilient bushings disposed in each of the bores in the first and second end portions.

14. The vehicle of claim 8, wherein the control arm assembly includes a control arm having a tubular arm member and a pair of tubular end members, the arm member having a longitudinal axis, the end member coupled to each end of the arm member, the end members oriented to the arm member such that the longitudinal axis of the end members is perpendicular to the longitudinal axis of the arm member.

15. A suspension system for attachment with an axle, the suspension system comprising:

a frame structure having a longitudinal side rail with a longitudinal aperture formed therein; and a control arm assembly having first and second end portions, the first end portion adapted to be pivotably coupled to the axle, the second end portion disposed in the longitudinal aperture and pivotably coupled to the longitudinal side rail, the control arm assembly being pivotable about the second end portion between a first position wherein the first end portion extends at least partially from the longitudinal aperture and a second position wherein the first end portion is completely disposed within the longitudinal aperture.

16. The suspension system of claim 15, wherein the side rail includes a pair of reinforcements, each one of the pair of reinforcements disposed within the longitudinal aperture and fixedly coupled to one of a pair of lateral side members of the side rail, the second end portion of the control arm assembly positioned between the pair of reinforcements.

17. The suspension system of claim 16, wherein each one of the pair of reinforcements has a frusto-conical shape.

18. The suspension system of claim 15, wherein each of the first and second end portions includes a bore that is perpendicular to a longitudinal axis of the control arm assembly.

19. The suspension system of claim 18, wherein the control arm assembly further includes a plurality of resilient bushings, the resilient bushings disposed in each of the bores in the first and second end portions.

20. The suspension system of claim 15, wherein the control arm assembly includes a control arm having a tubular arm member and a pair of tubular end members, the arm member having a longitudinal axis, the end member coupled to each end of the arm member, the end members oriented to the arm member such that the longitudinal axis of the end members is perpendicular to the longitudinal axis of the arm member.

* * * * *